(No Model.)
W. L. SILVEY.
SECONDARY BATTERY.
No. 477,914. Patented June 28, 1892.
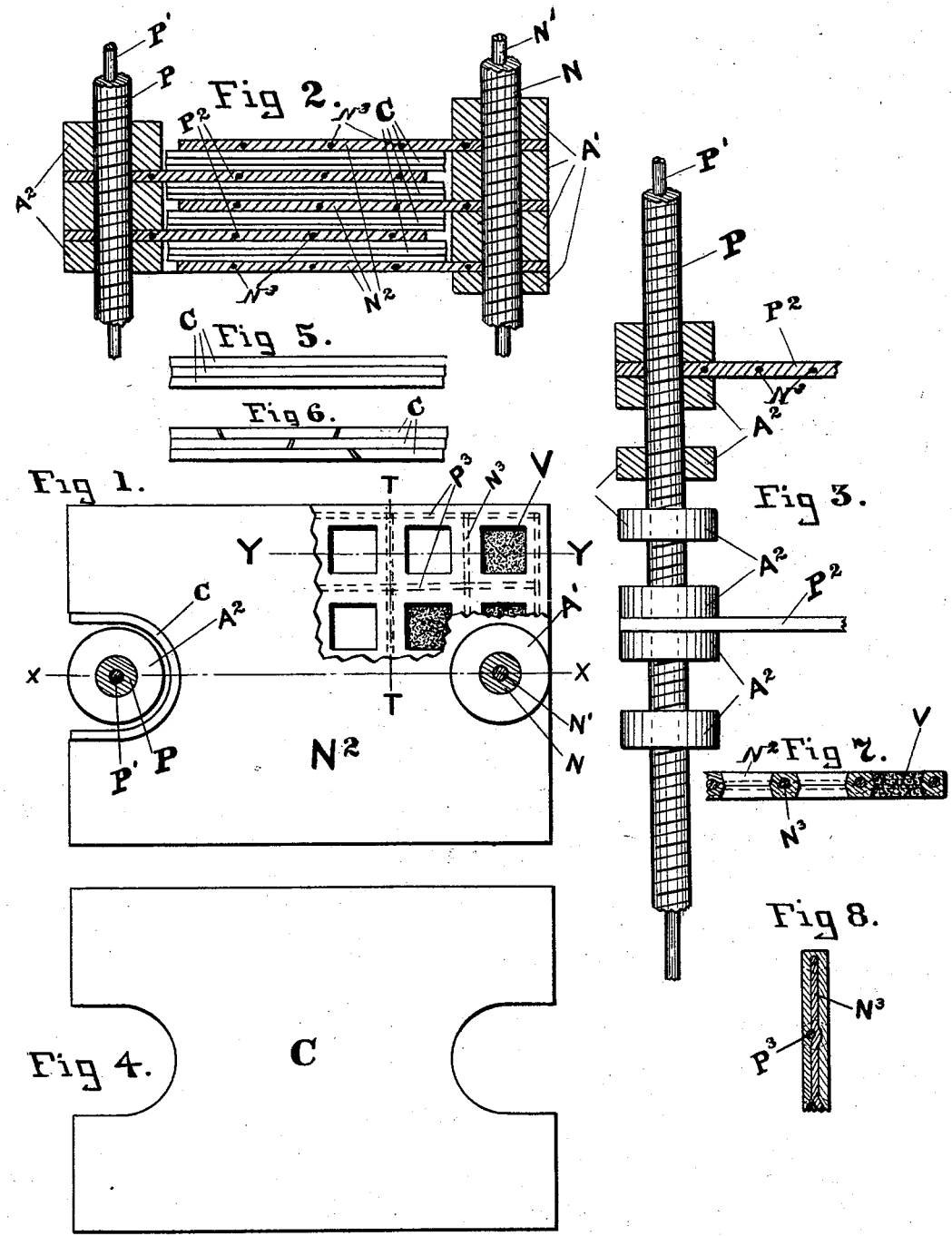

UNITED STATES PATENT OFFICE.

WILLIAM L. SILVEY, OF LIMA, OHIO.

SECONDARY BATTERY.

SPECIFICATION forming part of Letters Patent No. 477,914, dated June 28, 1892.

Application filed June 15, 1891. Serial No. 396,281. (No model.)

*To all whom it may concern:*

Be it known that I, WILLIAM L. SILVEY, a resident of Lima, in the county of Allen and State of Ohio, have invented certain new and useful Improvements in Secondary Batteries, of which the following is a specification.

My invention relates to the construction of secondary batteries having multiple plates; and the object is to construct a battery so arranged as to be very simple in construction, easily put together, and if needing repairs easily done at the same time—a battery the parts thereof nearly indestructible in the places where most batteries first break down— i. e., the connections—at the same time very light, and the most compact form attainable when capacity, solidity, and utility are considered.

Referring to the accompanying drawings, Figure 1 represents a top view of my battery, the connections broken off and shown in section; also, a battery-plate broken away in order to show the construction of the grids. Fig. 2 is a vertical section through Fig. 1 along the horizontal dotted line X X, parts broken away in order to better illustrate the construction. Fig. 3 represents the connecting bar on the positive side in order to show the manner of connecting the positive plates to it and otherwise illustrate the battery construction, the parts being shown in broken section and perspective, as will best answer the purpose for description. Fig. 4 shows a plan view of the plates of separating material, by which the positive and negative elements in the battery are separated or isolated from each other. Fig. 5 shows an edge view of three of these separating-plates C in perfect condition. Fig. 6 shows the separating-plates broken at different places in order to show the advantage that I acquire by using several plates. Fig. 7 shows a longitudinal broken sectional view of a battery-plate $N^2$ along a dotted line Y Y of Fig. 1, and Fig. 8 shows a broken section through a battery plate $N^2$ along the vertical dotted line T T in order to show the grid construction.

The battery-plate or grid is divided into squares, as shown at the broken section at the upper right-hand corner of Fig. 1, the holes in these squares being filled with a metallic oxide V in the usual manner, so that the plate when complete will be smooth. It is to be remembered that all the plates $N^2 P^2$ are very similar, so that a description of one plate answers for all. These plates are cast in a mold, grooves in the mold having wires $P^3 N^3$ layed in them, and the lead or other metal is poured around them. This firmly embeds the wires in the plate and forms a perfect union with the metal grid, so that the disintegrating action of the plates will be prevented and the plates made to last indefinitely. I have found that aluminum is best for these wires $P^3 N^3$, they being almost entirely unacted upon by a sulphuric-acid solution, so that a plate constructed as I show, with an aluminum or platinum wire cast into it, will be good even if the entire lead in the plate is converted into a lead oxide, at which time all other batteries would have to renew the positive plates, if not the negative plates also.

I wish it understood I do not claim copper; but I do claim the use of wires of aluminum or platinum in combination with a lead or other soft-metal plate, this style of plate being much lighter and more durable than any other. Figs. 7 and 8 fully illustrate the disposition of the aluminum wires $P^3 N^3$, by which it will be observed that the ribs of the plate are traversed by the cross-wires, making them very strong, and the outer metal being cast onto the wires a perfect joint is formed.

It is to be understood that secondary batteries as constructed at this time are subject to all the disadvantages of any comparatively new device, and are therefore very apt to break down when least expected. The principal causes can be traced to buckling of the plates, whereby short circuits are formed, dropping out of the filling into the plates, the breaking connections between the plates themselves and the connecting-pieces, by which the plates in each group, positive or negative, are connected together and to the external circuit, or the complete oxidizing of the grids themselves. It was to overcome many of these difficulties entirely that a radical change has been made by me in the construction of the battery which forms the subject of this specification.

Heretofore the battery-plates have been connected together almost entirely by lead connectors, to which they are "soldered" or "burned," as it is usually termed; but owing to lead having a low melting-point, its extremely low tensional and torsional qualities, and its graet affinity for oxygen it is very hard to solder into a firm adhering mass, for wherever oxide appears the joint will not unite, and if a soldering solution is used the moisture often creates air-bubbles, and the joint is very unreliable, easily broken, and deceptive, often giving way when least expected. To overcome many of these objections, I have adopted a plan which is in every way satifactory; or, in other words, I clamp my plates fast onto my connecting-pieces. To do this, I take rods P N, about one-fourth to one-half inch in diameter and ten to fourteen inches long, and cut a screw-thread on them. I now take metal blanks or nuts $A'$ $A^2$ and drill holes in them, which are tapped out to fit the connecting-rods. I now prepare my battery-plates $P^2$ $N^2$ for mounting, leaving a large notch out of one side, as shown at the left in Fig. 1, and a hole drilled or cast in the opposite side of the plate, this hole being made large enough to easily admit over the rods P N. The plates are now strung onto the rods, alternate ones being positive or negative, as shown in Fig. 2. Between each two plates of the same kind on each rod is placed one of the nuts, which are screwed down tight against the plates, firmly locking them together and to the connecting-pieces P N, making the most firm connections possible.

The connecting-rods P N, I prefer to make of aluminum, as also the nuts $A'$ $A^2$, which, being inoxidizable in a sulphuric-acid solution, are therefore not attacked by peroxide of hydrogen gas, will last indefinitely, and, being stiffer than lead, may be made smaller in diameter, but still be of a very much higher conductivity. In case where it is found desirable to use a soft metal—as lead or lead alloy, &c.—for the connecting-rods P N and the nuts or collars $A'$ $A^2$ it will be found very essential that a central rod $P'$ $N'$ be inserted. This central rod or core is a rod of aluminum, which is preferable to all the other metals, it being the best conductor of all metals of an equal weight. The central rods $P'$ $N'$ are cast into the outer rods P N by being first set into a mold and the other metal poured around it. In case where it is desired to roll them, the central rod may have the outer shell drawn down on it; but I prefer to cast the outer shell onto the core for the reason that in this case a more firm union will be formed and the ends of the central core $P'$ $N'$ will then be covered by the outer metal.

Between the plates $N^2$ $P^2$ in the battery I place a layer of porous material, made of spruce, pine, poplar, or other soft wood which has been reduced to a thoroughly impalpable mass by boiling, grinding, and treating with acid and lime until every particle of the fibrous structure has been reduced. It is next passed through rolls and rolled into a sort of paper, which I term "pulp-board." This board I cut in shape to correspond with the general outline of the battery-plate, niches being removed from opposite edges for the passage of the connecting-bars and for the reception of the metal nuts, as shown in Fig. 4. Two or more thicknesses of this board are now laid together between the plates in the battery, as shown in Fig. 2, the plates of pulp-board $c$ being laid close together, as in Figs. 5 and 6. The reason for using two or more layers of this board together will become apparent upon consulting Figs. 5 and 6, in which it will be seen that while Fig. 5 shows the pieces laid together in perfect condition; but in case they were a single piece and it should become any ways torn, it being very soft in the acid solution, the filling of the plates could pass through the opening and might short-circuit them; but where they are built up of numerous layers it would be a very unlikely thing for them to all tear at the same place, but rather they would become broken, as shown in Fig. 6. Another very important advantage in using numerous layers of this separating medium is that it allows a more ready circulation of the liquid between the layers and also a more ready escape of the gases formed in the forming and charging of the batteries. These points are very important from a practical standpoint and go far to make a secondary battery adaptable to the rough handling which they get in propelling street-cars, driving omnibuses, running the electric headlight, and the thousands of other uses to which this battery is best adapted.

Having fully described my invention, what I claim as new, and wish to secure by Letters Patent in the United States, is embodied in the following claims:

1. In a secondary battery, an electrode therefor, consisting of a number of plates, and in combination therewith a connecting-rod consisting of a central core of high conductivity inoxidizable in sulphuric acid, an outer covering therefor of low conductivity, cast round the central core, forming a bar or rod, with a continuous screw-thread on its surface, the battery-plates having two plain surfaces, and a series of nuts between the plates for binding them together and to the screw-rod, as set forth.

2. In a secondary battery, the combination, with the active plates, of rods for connecting the plates to the external circuit, the rods having a continuous central core, of a metal indestructible in the electrolyte and an outer continuous envelope cast round it, having a screw-thread on its surface, and nuts, as set forth.

3. In a secondary battery, the combination of a series of metal plates, a continuous screw-threaded rod having a central core and metal nuts, the plates having holes extending through them for the easy admission of the rod, the two being clamped together by the nuts pressed against the sides of the plates and engaging the screws on the rod.

4. In a secondary-battery connecting device, the combination of a rod having an external surface of a metal having a continuous screw-thread on its length, an internal core having a higher conductivity than the outer metal, the two cast together, and a series of nuts engaging the screw-rod, with the battery-plates pressed between them, as set forth.

5. In a secondary battery, the metal battery-plates of the positive and negative electrodes respectively arranged alternately, having holes in them, through the medium of which the several plates of each electrode are connected together, in combination with a continuous screw-threaded rod having a central core, and plates of a porous separating medium placed between the plates having notches, and metal nuts engaging the screw-threaded rod on both sides of the metal plates and located in the notches in the porous plates, as set forth.

6. In a secondary battery, the combination of the positive and negative battery plates, a separating material therefor, consisting of two or more separable plates of a liquid-absorbing material having notches in them, and the screw-threaded rods and nuts, to which the plates are connected, located in notches in both the plates and the separating material and engaging the rods on both sides of the metal plates, as set forth.

7. In a secondary battery, the metal conductor-plates $P^2$ $N^2$ of the positive and negative electrodes and a liquid-absorbing separating medium C between the plates, having notches, in combination with screw-threaded connecting-rods P N, having metal nuts $A'$ $A^2$, the nuts located in the separating medium and engaging the rods on both sides of the conductor-plates, as set forth.

8. In a secondary battery, a connecting-bar therefor, having a central core cast therein, said bar consisting of a continuous central core, an outer covering of metal having a screw-thread thereon, battery-plates with holes therein, the connecting-bar passing through the holes, and the plates made fast to the connecting-bar by means of nuts pressed against the opposite faces of the plates, as specified.

9. In a secondary battery, a plate element or electrode consisting of a central grating of wires of aluminum, an outer covering for the central grating of a soft metal, such as lead, and an active material consisting of a metallic oxide supported thereby.

10. In a secondary battery, the combination, with the battery-plates of the positive and negative electrodes, of a separating material for the electrodes, consisting of two or more layers of wood-pulp board, having parallel sides in contact with each other and with the sides of the electrodes, which they separate, and having notches in their edges, with rods and metal nuts, to which the battery-plates are connected, located in the notches in the pulp-board, as set forth.

In testimony whereof I hereby set my hand this 12th day of June, 1891.

WILLIAM L. SILVEY.

Witnesses:
GUY FULTON,
C. U. RAYMOND.